United States Patent [19]

Goodwin

[11] Patent Number: 5,277,802
[45] Date of Patent: * Jan. 11, 1994

[54] DUAL CARTRIDGE FILTER EMPLOYING PH CONTROL

[75] Inventor: Percy E. Goodwin, Mill Creek, Wash.

[73] Assignee: Healthguard, Incorporated, Mill Creek, Wash.

[*] Notice: The portion of the term of this patent subsequent to Mar. 3, 2009 has been disclaimed.

[21] Appl. No.: 879,195

[22] Filed: May 5, 1992

Related U.S. Application Data

[63] Continuation-in-part of Ser. No. 797,774, Nov. 25, 1991, which is a continuation-in-part of Ser. No. 505,916, Apr. 6, 1990, Pat. No. 5,092,993.

[51] Int. Cl.$^5$ .................. B01D 35/30; C02F 1/70; C02F 1/72
[52] U.S. Cl. .................. 210/202; 210/209; 210/232; 210/286; 210/287; 210/315; 210/438; 210/440; 210/443
[58] Field of Search ............... 210/282, 202, 206, 266, 210/663, 209, 232, 286, 287, 315, 438, 440, 443, 668, 757, 758, 264, 673, 492, 497.1, 503, 238, 754

[56] References Cited

U.S. PATENT DOCUMENTS

| | | | |
|---|---|---|---|
| 4,652,381 | 3/1987 | Inglis | 210/726 |
| 4,659,463 | 4/1987 | Chandler et al. | 210/290 |
| 4,713,175 | 12/1987 | Bray | 210/266 |
| 4,732,674 | 3/1988 | Tamura et al. | 210/282 |
| 5,092,993 | 3/1992 | Goodwin | 210/202 |

Primary Examiner—Stanley S. Silverman
Assistant Examiner—Cynthia L. Messler
Attorney, Agent, or Firm—Christensen, O'Connor, Johnson & Kindness

[57] ABSTRACT

A filter system (10) is disclosed that includes a filter assembly (12) and input/output hardware (14). The filter assembly includes a housing (16) and cap (18) that cooperatively support a prefilter (20) and main filter (22) in a fluid flow path. Fluid flow through the filter assembly occurs radially through the prefilter and axially or radially through the main filter. The main filter includes an alkaline leaching agent to raise the pH of fluid flowing therethrough to, for example, between 8 and 10. A method is also disclosed for evaluating the effectiveness of the filter system in reducing a select contaminant from the fluid by evaluating the effectiveness of the filter system in raising the fluid's pH.

7 Claims, 7 Drawing Sheets

DUAL CARTRIDGE FILTER EMPLOYING PH CONTROL

RELATED APPLICATION

This applicatin is a continuation-in-part application under 37 C.F.R. Section 1.60 of pending prior application Ser. No. 07/797,774, filed on Nov. 25, 1991, which in turn is a continuation-in-part of application Ser. No. 07/505,916, filed on Apr. 6, 1990, now U.S. Pat. No. 5,092,993 the benefits of the filing dates of which are hereby claimed under 35 U.S.C. Section 120.

FIELD OF THE INVENTION

This invention relates generally to fluid filters and, more particularly, to the adaptability of such filters.

BACKGROUND OF THE INVENTION

Systems for filtering fluid have been developed for use in a wide variety of commercial, industrial, and domestic applications. Some systems employ mechanical or physical barriers to block micropollutants, particulate, and other materials in the fluid. Other systems rely upon carbon to reduce materials in the fluid through adsorption or reduction-oxidation (redox) materials to induce electron transfers that reduce the content of a material in the fluid. Some systems even use a combination of the foregoing techniques to achieve the desired filtering, treatment, purification, or conditioning (collectively referred to herein as filtering) of the fluid.

As with the type of filtering process employed, the fluids to be filtered by different systems may vary widely. For example, the fluids may be gaseous or liquid, and may have relatively high or low viscosities. Further, the pressure of the fluid may vary greatly, above and below one atmosphere. As will be appreciated, each of these factors may influence the design and operation of a filter system.

One particular fluid of interest to be filtered is water. As will be appreciated, water has many industrial, commercial, and domestic uses in which some threshold level of purity is desirable. The most common example is the use of water in the home for drinking and cooking. The water available from many sources and distribution systems, however, is unsuitable for such uses because it includes contaminants such as particulates (e.g., scale, rust, soil, or sediment), micropollutants (e.g., giardia, salmonella, et cetera), bacteria, chemicals (e.g., chlorine, hydrogen sulfide, lead, trihalomethanes, and other inorganics). As a result, there has been a significant expansion in the world market for bottled water and water filter systems.

A conventional water filter system often includes a housing for receiving at least one filter element in a path of fluid flow defined by the housing. The filter element typically includes a shell or frame and a filter medium supported by the shell. Commonly used filter media include close-woven textiles, metal screens, string-wound fibers, papers, nonwoven fabrics, carbon granular beds, and various reduction-oxidation (redox) media.

Addressing the construction of several common filter elements in greater detail, one embodiment is cylindrical in shape and includes a paper filter medium or barrier, which may be rolled or folded around the perimeter of a porous cylindrical core. The core is seated against the housing at both ends and water flows radially through the assembly, while the paper filter blocks particulate.

Alternatively, the filter element or barrier may be formed by winding a suitable fiber or string about a perforate cylindrical core. Each end of the fiber wound about the core abuts a circular seal provided on the housing. Water flows radially between the wound fibers, which are spaced to block the desired contaminants.

In yet another embodiment, the filter element or cartridge is a cylindrical shell, filled with an adsorbent or electron transfer media. For example, the shell may contain a granulated activated carbon (GAC), such as charcoal. The shell is impermeable and coupled to the housing at both ends by seals, directing the flow of water axially through the GAC. The GAC, through adsorption, reduces or removes chlorine and its associated taste, as well as hydrogen sulfide and its associated odor from the water. The spacing between the granules, further, obstructs the flow of particulate in the water.

One of the most common problems with such conventional filter systems is their inability to remove small particulate at high filtration rates. Typically, a high filtration rate is achieved only by employing a number of independent filter elements in independent housings, significantly increasing system size and expense. Further, filter elements designed to remove small particulate will typically clog relatively quickly when exposed to larger particulates, reducing flow to undesirably low rates, and therefore requiring frequent replacement of the filter elements.

Another problem with conventional systems of the type described above is that they are typically only suited for use in reducing or removing certain types of contaminants. More particularly, a given filter element may be suitable for use in filtering water including particulates but not chemicals, or may be suitable only for reducing certain types of chemicals. As a result, a filter system that works well in one part of the country may be completely inadequate in another geographic area.

In addition to having limited adaptability to various water conditions, many conventional filter systems are not readily placed in different physical environments. For example, when a filter system is to be used in the home, it may be desirable to locate the housing and filter element either above or below a kitchen or bathroom countertop. Conventional filter systems, however, are not readily adaptable for efficient use in these different locations.

In summary, it would be desirable to provide a low-cost system that is capable of filtering small particulate at a high volumetric rate, without frequent filter element replacement, and that is usable with a wide variety of fluid conditions and in a variety of environments.

SUMMARY OF THE INVENTION

In accordance with this invention, a cartridge is disclosed, for filtering water flowing therethrough. The cartridge includes a housing for defining a water flow path. Filter media, supported within the housing, are included to filter water flowing therethrough. An alkaline leaching agent, also supported within the housing, is included to increase the pH of water flowing therethrough. The alkaline leaching agent may include an alkali metal salt, such as potassium carbonate, or an alkaline-earth metal salt, such as calcium carbonate or magnesium carbonate. The alkaline leaching agent may increase the pH of water flowing therethrough to between 8 and 10 and, in a preferred arrangement, to roughly 10.

In accordance with another aspect of this invention, a method is disclosed for evaluating the effectiveness of a water filter in having a second influence on water flowing through the filter. The water filter is also useful in having a first influence on water flowing through the filter. The method includes the step of evaluating the effectiveness of the water filter in having the first influence on the water. An empirically determined relationship between the effectiveness of the water filter in having the first influence on the water and the effectiveness of the water filter in having the second influence on the water is also consulated. The effectiveness of the water filter in having the second influence on the water is then determined based upon the evaluated effectiveness of the water filter in having the first influence on the water and the empirically determined relationship between the effectiveness of the water filter in having the first and second influence on the water. The first influence is, for example, the increasing of water's pH and the second influence is the reduction of a select contaminant from the water.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
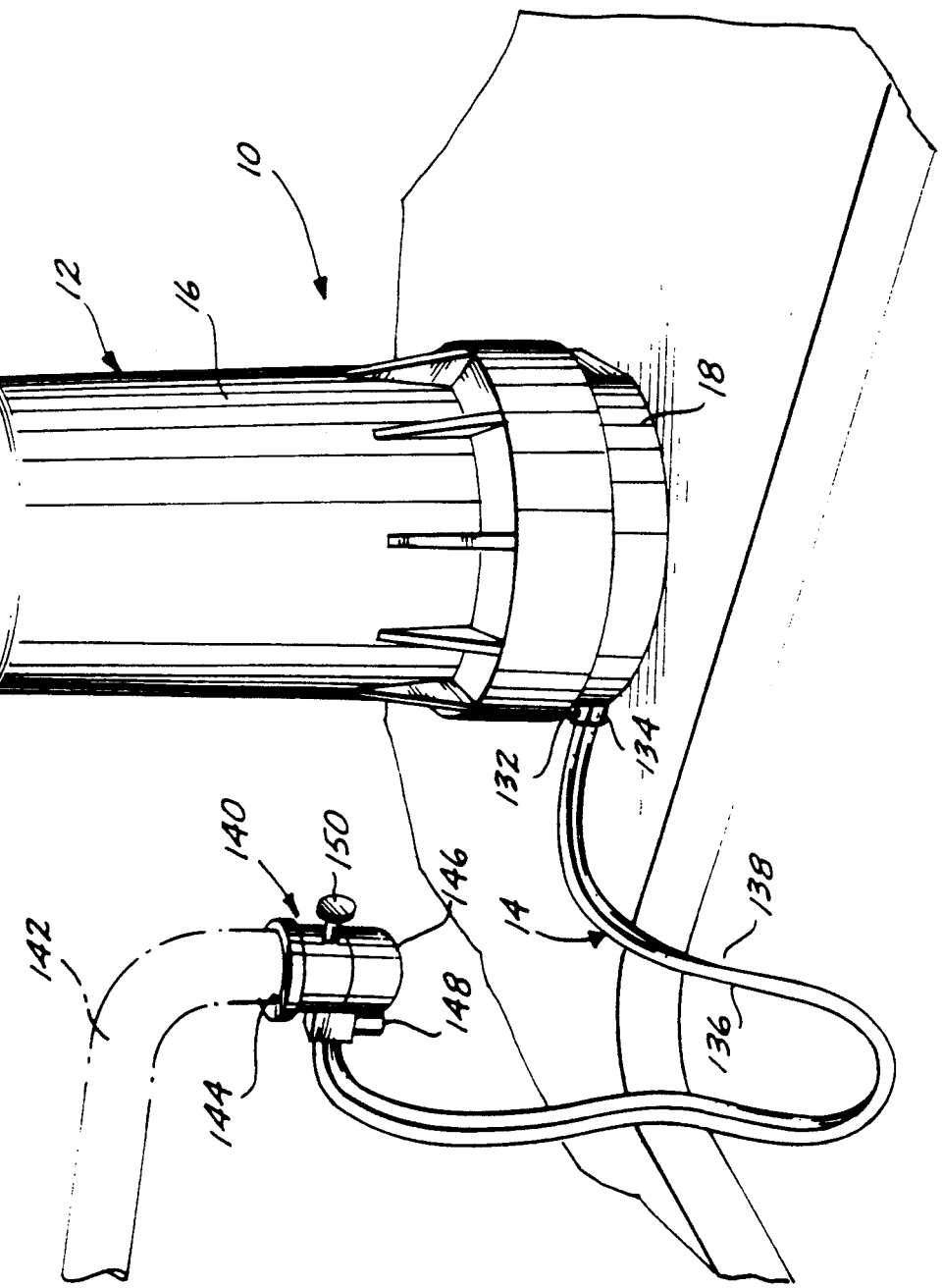
FIG. 1 is an illustration of one embodiment of a filter system constructed in accordance with this invention designed for use in an above-the-counter application.

Referring now to FIG. 1, a filter system 10 is shown including a filter assembly 12 and input/output hardware 14. The filter system 10 is designed primarily to reduce or remove undesired material in a fluid. In a preferred application, the filter system 10 includes barrier, electron transfer, and carbon adsorbent elements to reduce or remove micropollutants, particulate, bacteria, chemicals, taste, and odor from water. As will be described in greater detail below, the filter system 10 provides excellent filtration of small particulate at high rates, is low in cost, and is adaptable to different water characteristics and physical installations.

Figure 2:
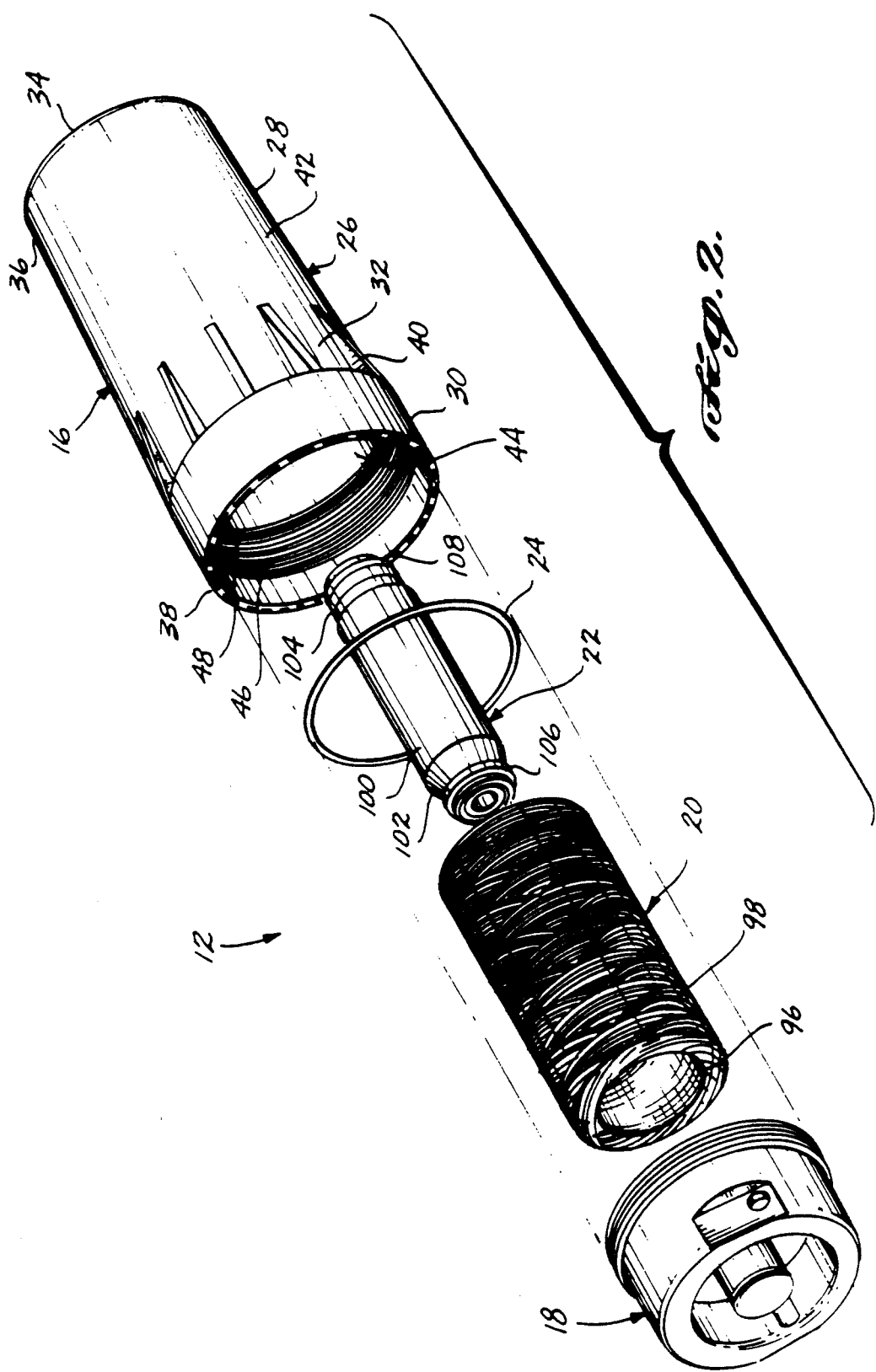
FIG. 2 is an exploded illustration of a filter assembly included in the filter system of FIG. 1, including a housing, cap, prefilter, and main cartridge.
Figure 3:
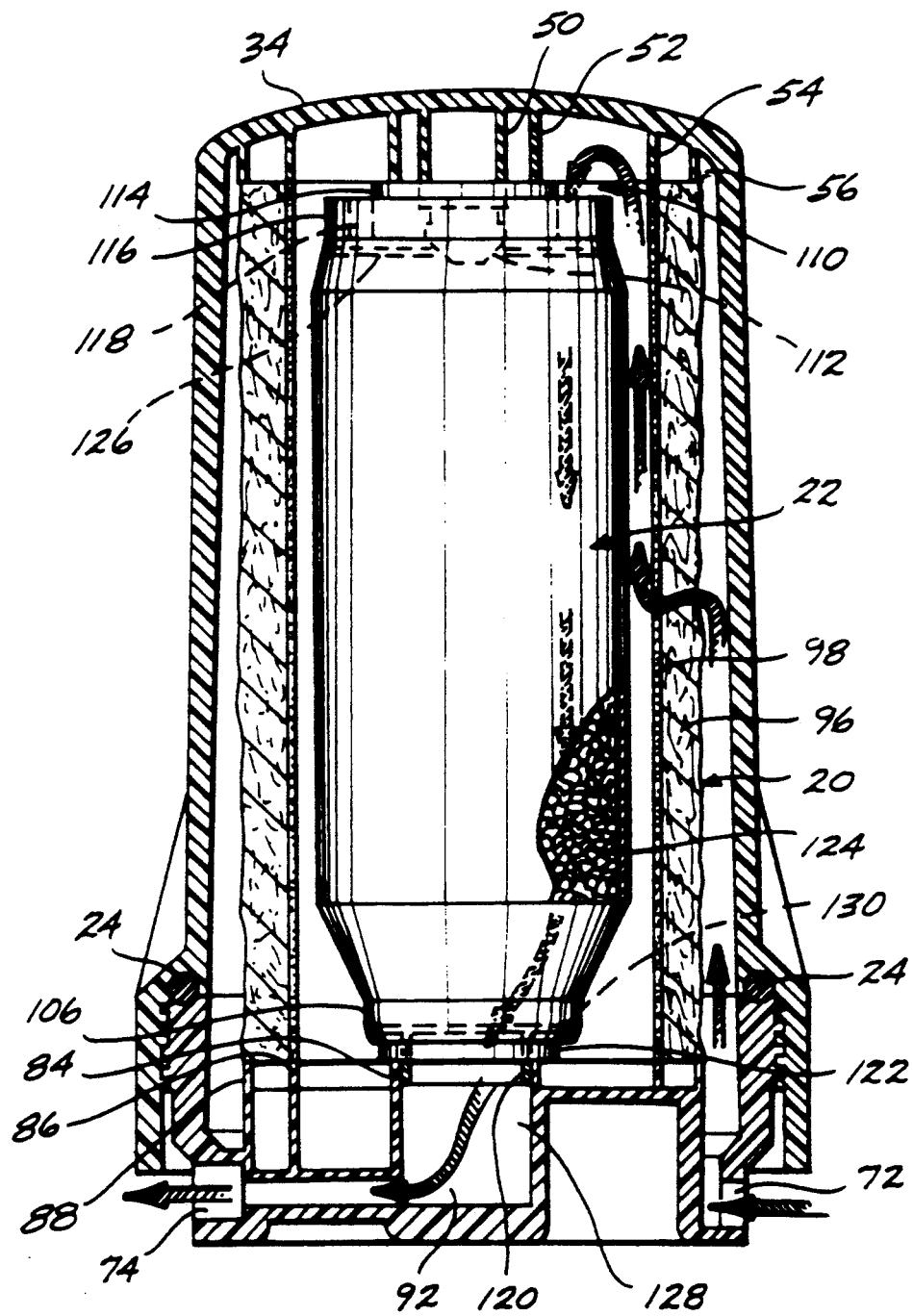
FIG. 3 is an illustration of the filter assembly of FIG. 2 in partial section, showing the fluid flow path therethrough.

Addressing the components of the filter system 10 individually, filter assembly 12 includes a housing 16, cap 18, prefilter 20, main filter or cartridge 22, and cap seal 24. As shown in FIGS. 2 and 3, the housing 16 includes a roughly cylindrical, generally tapered body 26 that is roughly 30 centimeters long and 0.6 centimeter thick. Body 26 has a main portion 28 that is separated from an extended lip 30 by a step 32. A dome 34 closes the narrow end 36 (roughly 15.5 centimeters in diameter) of body 26, while the wide end 38 (roughly 19 centimeters in diameter) of body 26 adjacent lip 30 is open. Ten equally spaced, radially projecting buttresses 40 are provided on the exterior 42 of the housing body 26 adjacent step 32.

The body 26 of housing 16 also has an interior 44 provided with a number of features. In that regard, the interior of the extended lip 30 is provided with threads 46. An O-ring gland 48 is also located inside housing 16, adjacent the step 32 between the main portion 28 and lip 30 of body 26.

The interior 44 of body 26 adjacent dome 34 is further provided with a series of coaxially aligned, circular structures including a central locator 50 and seals 52, 54, and 56. The locator is roughly 2.1 centimeters in diameter and 2.4 centimeters high. Seal 52 is the main cartridge seal and is coaxially aligned with locator 50. The seal 52 is roughly 1.7 centimeters high and 3.8 centimeters in diameter. Seals 54 and 56 are known as first and second prefilter seals and are also coaxially aligned with locator 50. Seal 54 is roughly 1.25 centimeters high and 9.8 centimeters in diameter, while seal 56 is roughly 0.9 centimeter high and 12.4 centimeters in diameter. The lip of the locator 50 and each seal 52, 54, and 56 is roughly 0.16 centimeter wide, with rounded edges.

Figure 4:
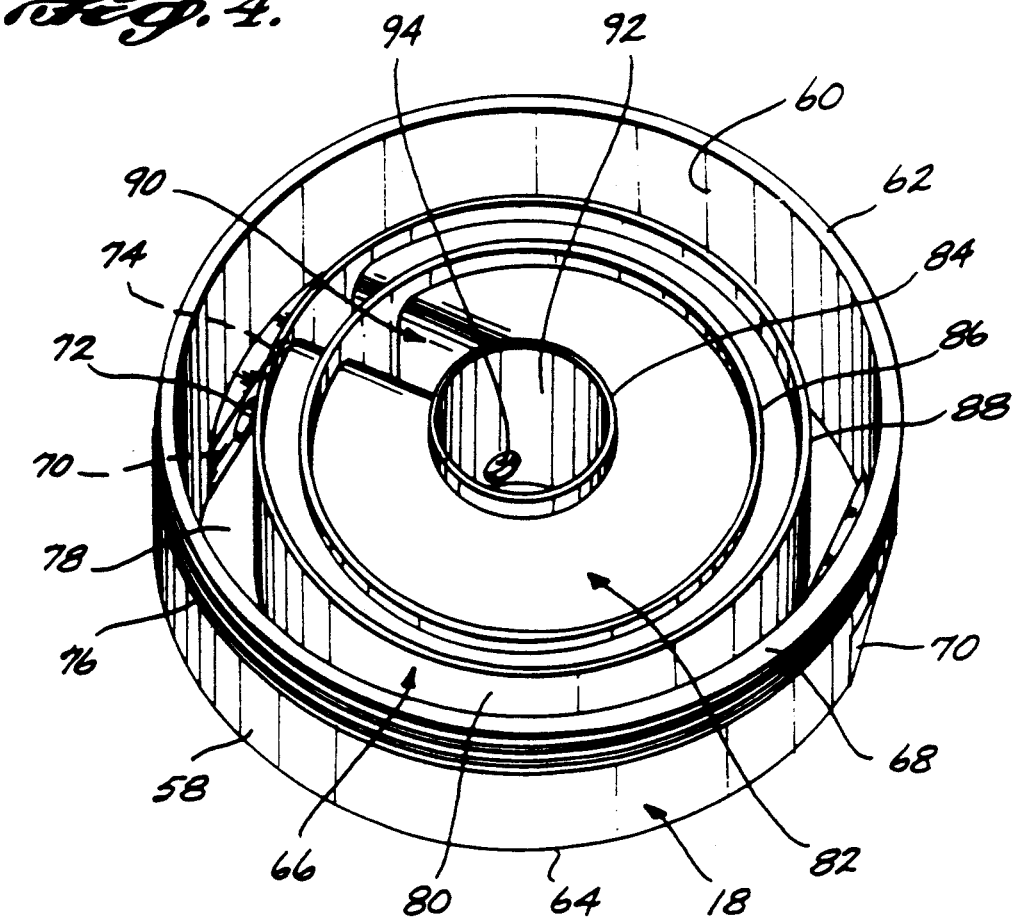
FIG. 4 is a more detailed illustration of a cap included in the filter assembly of FIG. 2.
Figure 5:
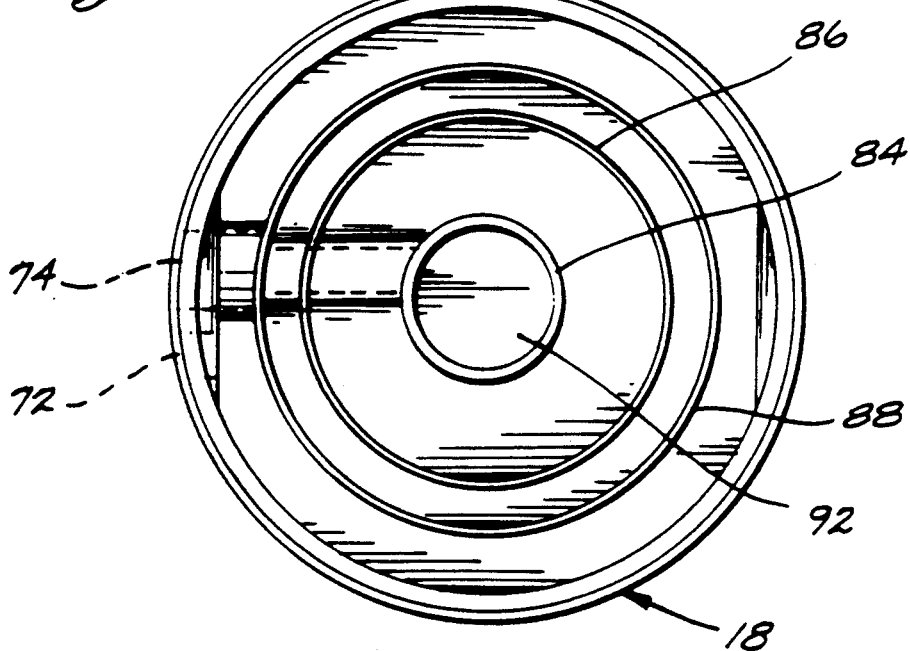
FIG. 5 is an illustration of the top of the cap shown in FIG. 4.

Addressing now the structure of cap 18, reference is had to FIGS. 2, 3, and 4. As shown, cap 18 includes a body 58 having an interior 60 and exterior 62. The cap body 58 is roughly cylindrical, being approximately 7.2 centimeters in height and 17.5 centimeters in major diameter. The body 58 of cap 18 is closed at one end 64 by a filter support structure 66 and is open at the other end 68. A pair of flat regions 70 are provided 180 degrees apart at the closed end 64 of cap body 58. In the embodiment of the filter system 10 shown in FIG. 1, one of the flat regions 70 is provided with an inlet port 72 and outlet port 74, which extend through the wall of cap body 58 and are radially offset therefrom, as shown in FIG. 5 and described in greater detail below. A series of threads 76, designed to mate with the housing threads 46, is located on the exterior 62 of cap 18, adjacent the open end 68 of cap body 58.

Addressing now the filter support structure 66 located at end 64 of the cap 18, as shown in FIG. 4, it includes a roughly annular section 78 that extends perpendicularly from body 58. The support structure 66 continues in a cylindrical wall 80, coupled to the annular section 78 and coaxially aligned with body 58. The cylindrical wall 80 projects toward the open end 68 of body 58 and terminates in a circular filter support shelf 82 that is roughly parallel to annular section 78.

As shown in FIG. 4, three coaxially aligned, circular seals 84, 86, and 88 are provided on the filter support shelf 82. Seal 84 is referred to as the main cartridge seal 84 and is roughly 0.5 centimeter high and 3.8 centimeters in diameter. Seals 86 and 88 are first and second prefilter seals, coaxially aligned with the main filter seal 84. Seals 86 and 88 are each roughly 0.5 centimeter high and are roughly 9.8 and 12.4 centimeters in diameter, respectively. The lip of each seal 84, 86, and 88 is roughly 0.16 centimeter wide, with rounded edges.

The filter support shelf 82 is coupled to the outlet port 74 by an outlet channel 90. As shown in FIG. 4, the outlet channel 90 includes a cylindrical recess 92 that is axially aligned with, and positioned inside, the filter seal 84. A tapered outlet tube 94, whose axis is roughly perpendicular to that of recess 92, intersects the cylindrical recess 92 and terminates in the outlet port 74. As shown best in FIG. 5, the outlet tube 94 is radially offset with respect to recess 92, i.e., its axis is parallel to, but offset from, the radius of recess 92.

As will be appreciated, the housing 16 and cap 18 are each preferably molded as integral items. Although various materials can be employed, in the preferred arrangement, both housing 16 and cap 18 are molded from an engineered polymer such as acrylonitril butadiene styrene (ABS). This material has been found to provide the desired strength, life, and water resistance required for most applications.

Addressing now the components to be received between housing 16 and cap 18, as shown in FIG. 2, the prefilter 20 includes a roughly cylindrical core 96 that is approximately 8.6 centimeters in diameter, 24.8 centimeters long, and 0.1 centimeter thick. Core 96 provides the support required by prefilter 20 and is made of an FDA-approved plastic such as polypropylene. Core 96 is further porous or perforated to allow water to flow radially therethrough.

A fiber or string 98 made, for example, of polypropylene and 1.5 millimeters in diameter is wound on core 96. The fiber 98 is preferably wound to a depth of 2.5 centimeters, giving the prefilter 20 an outer diameter of 13.65 centimeters. The number of crossings of fiber 98 measured in a cross-sectional plane perpendicular to the axis of core 96 is preferably on the order of 39, but generally should not be less than 27. Further, if the exterior of the string-wound prefilter 20 is exposed to pressurized air, a pressure differential of approximately one p.s.i. should preferably be experienced between the exterior and interior of the prefilter 20. For a prefilter 20 constructed in this manner, the outermost layers of fiber 98 block particulate and micropollutants three to four microns in diameter, while the inner layers block particulate and micropollutants down to one-half micron in diameter.

As will be appreciated, the prefilter 20 can be constructed differently for use in different applications. For example, a different fiber 98, or the same fiber 98 wound in a different manner, can be employed. Alternatively, a folded, molded, or pleated paper filter could be supported about core 96 in place of the wound fiber 98.

Turning now to the description of the main cartridge 22, as shown in FIGS. 2 and 3, it includes a polypropylene shell 100 that is roughly 1.2 millimeters thick. The cartridge shell 100 has a generally cylindrical, tapered construction, provided with steps 102 and 104 adjacent outlet and inlet ends 106 and 108, respectively.

Figure 6:
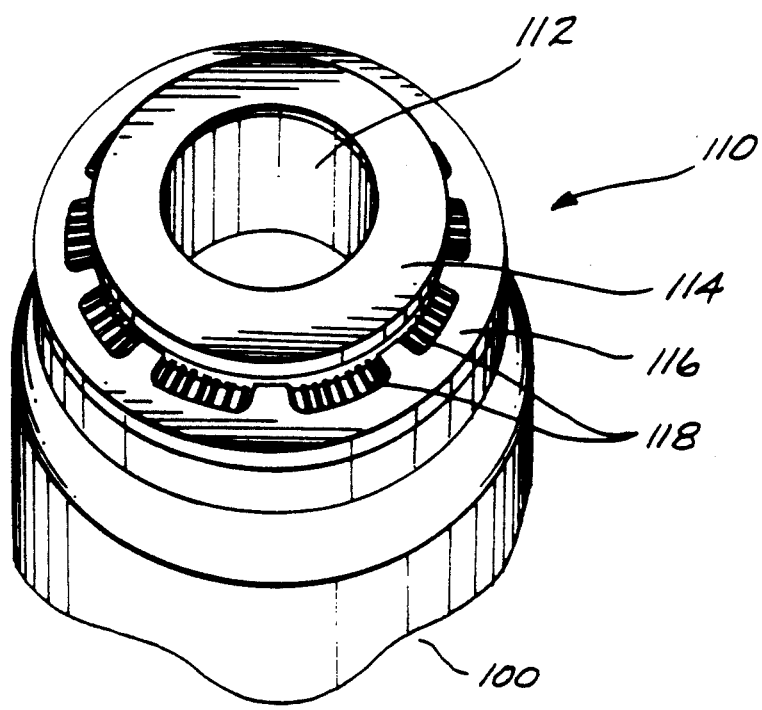
FIG. 6 is an illustration of the inlet end of the main cartridge of FIG. 2.

The inlet end 108 of main cartridge 22 includes an inlet and gasket assembly 110, as shown in greater detail in FIG. 6. As shown, assembly 110 includes a locator cup 112, which extends into the cartridge shell 110. An annular rubber gasket 114, roughly 2 millimeters thick, 5.8 centimeters in outer diameter, and 2.8 centimeters in inner diameter, is adhesively attached to shell 100 around the locator cup 112. The gasket is supported by an inlet plate 116, which joins cup 112 to shell 100. The inlet plate 116 is provided with a plurality of cartridge inlet ports 118 located radially around the gasket 114 and constructed to limit channeling.

Figure 7:
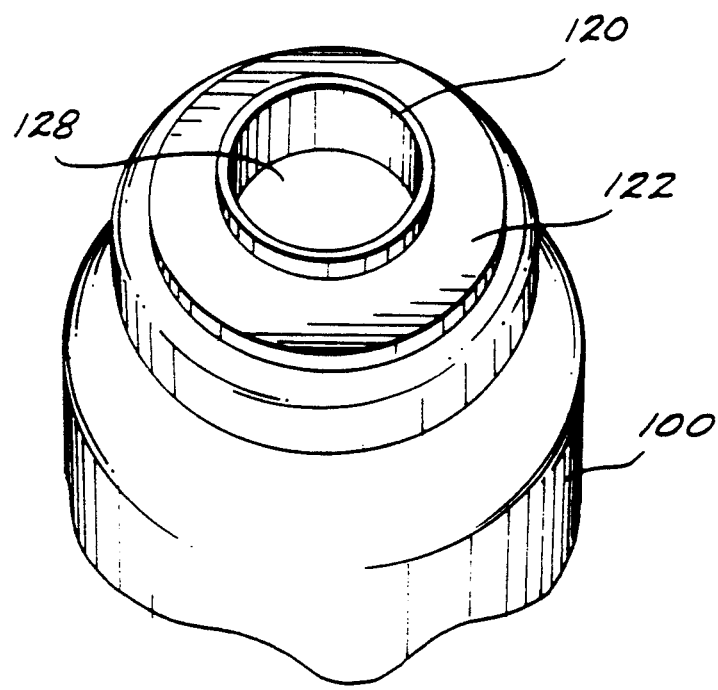
FIG. 7 is an illustration of the outlet end of the main cartridge of FIG. 2.

The outlet end 106 of cartridge shell 100 is shown in greater detail in FIG. 7. As shown, a circular exit sump 120, roughly 3.6 centimeters high and 2.6 centimeters in diameter, is provided. The exit sump 120 is surrounded by an annular rubber gasket 122 adhesively attached to shell 100. Gasket 122 is roughly 2.6 millimeters thick, 5.8 centimeters in outer diameter, and 2.8 centimeters in inner diameter. In the preferred arrangement the axial spacing between gaskets 114 and 122 is roughly 24.8 centimeters.

As shown in the cross-sectional view of FIG. 3, the shell 100 of main cartridge 22 is filled with, for example, roughly 390 cubic centimeters of filter media 124. This media 124 is prevented from escaping through the inlet ports 118 of main cartridge 22 by a separator 126 and is prevented from escaping through the outlet opening 128 of main cartridge 22 by another separator 130.

Depending upon the anticipated condition of the water or other fluid to be filtered, one or more of a variety of filter media 124 can be employed in the main cartridge 22. In that regard, filter media 124 may include GAC, which substantially improves taste and odor by reducing organics as well as chlorine. Filter media 124 may also be of the type that initiates a reduction-oxidation (redox), electron transfer reaction in the water to reduce chlorine, hydrogen sulfide, and other inorganics, as well as attenuate bacterial growth in any GAC used.

As one example of such a redox material, media 124 may be composed of electrolytic quality copper and zinc, which create an electrolytic potential that causes electron transfers in water passing therethrough. This material is suitable if the water contaminants to be reduced include lead, chlorine, and THMs. An example of such media 124 is the material sold under the trademark KDF 55D by Oxidation Reduction Corp. of Constantine, Mich. Alternatively, if the water includes high levels of hydrogen sulfide, the media 124 may be more suitably the type sold by Oxidation Reduction Corp. under the trademark KDF 85D. When more than one type of media 124 is included in shell 100, the various types are separated by separators that allow water to pass therethrough, while restricting the migration of the media components.

In another embodiment, the media 124 also includes an alkaline leaching agent, such as an alkali metal salt or alkaline-earth metal salt, selected from a group including, but not limited to, calcium, magnesium, potassium, or sodium carbonate, sulfate, citrate, oxylate, or oxide to increase the pH and oxygen content of the water processed by the filter assembly 12. By drinking alkaline water, an individual's body is advantageously more readily able to dispose of acidic waste products, as described in greater detail in Whang, Reverse Aging, published by JSP Publishing, P.O. Box 570987, Perrine, Fla. 33257-0987.

By way of illustration, distilled water conventionally has a pH on the order of 7, with tap water having a slightly higher pH. At a pH of 7, the number of hydrogen (H+) ions and hydroxyl (OH−) ions in the water are equal. If the pH is increased, however, the alkaline water has fewer H+ ions than OH− ions and, thus, more oxygen atoms than at a pH of 7. By way of example, the Whang publication cited above indicates that there may be on the order of $5 \times 10^{20}$ more atoms of oxygen or ions containing oxygen in ten ounces of water having a pH of 10 than in ten ounces of water having a pH of 7.

In the present embodiment, roughly one-third of the media 124 comprises, for example, calcium and magnesium carbonate. These alkaline-earth carbonates may be uniformly integrated into the other media material, provided in a separate compartment located at one end of the cartridge if the cartridge is designed for axial water flow, or provided in a separate outer annular compartment extending the length of the cartridge if the cartridge is designed for radial water flow. Alternatively, the main cartridge might be reduced in size and a secondary cartridge employed to house the alkaline leaching agent. As will be appreciated, such a secondary cartridge could be constructed and positioned to accommodate either axial or radial water flow.

The volume and distribution of the calcium carbonate included in the cartridge is a function of several factors. These factors include the magnitude of the pH change that is to be effected in the processed water, as well as the useful life of the cartridge for pH adjustment. In the currently preferred arrangement, in which roughly 130 cubic centimeters of calcium and magnesium carbonate are distributed through media 124, an increase in the water's pH from 7 to 10 can be accomplished and an effective cartridge life of over 2700 liters of water achieved.

As an aside, it should be noted that the desirability of controlling water pH has been recognized in the prior art of electrolytic water filters. In that regard, U.S. Pat. No. 3,933,606 (Harms) discloses a system in which the pH of water is established between 8.0 and 10.0 prior to electrolytic filtering by adding an aqueous acid, such as hydrochloric acid, or an aqueous base, such as calcium hydroxide, to the water. Similarly, U.S. Pat. No. 4,525,253 (Hayes et al.) describes a system in which the pH is kept between 7.4 and 7.6 by using muriatic acid to lower the pH or sodium carbonate to raise the pH. In both cases, however, the pH adjustment is apparently performed to allow contaminants to be more efficiently removed electrolytically. In contrast, the arrangement described above is directed to an entirely different, physiological problem and is advantageously employed in nonelectrolytic filter systems.

The inclusion of an alkali leaching agent in the cartridge also presents an opportunity to monitor the effectiveness of the other media elements. In that regard, the pH of water processed by the filter assembly 12 can be easily and inexpensively evaluated by dipping a piece of litmus paper in the water. As is well known, the color of such paper turns red if the water is relatively acid and turns blue if the water is relatively alkaline. Thus, a qualitative evaluation of the filter's usefulness in achieving the desired alkalinity is readily available.

More particularly, a litmus test is initially performed on water prior to being processed by the filter assembly 12. The resultant color of the litmus paper, typically a light blue, is then used as a reference color for subsequent evaluation. Next, a litmus test is performed on water that has been processed by the filter assembly 12. Early in the life of the cartridge, the color of the litmus paper used in this post-processing test will be a relatively dark blue. As the calcium and magnesium carbonate are depleted, however, the pH of the processed water will decrease and the color of the litmus paper used in the post-processing test will be lighter. Eventually, the color of the litmus paper used to test the water before and after processing will be the same, indicating that the cartridge is no longer effective in controlling the water's pH.

In accordance with the present invention, this litmus test can also be used to extrapolate the depletion of the other elements in media 124 and, hence, to evaluate the remaining life of the cartridge. More particularly, an empirical study is initially conducted to evaluate the performance of the filter assembly 12 when processing water of known chemical characteristics. The ability of the filter assembly 12 to, for example, control the pH of the water; reduce the content of lead, chlorine, hydrogen sulfide, and other inorganics in the water; and remove particulates from the water is monitored as a function of the volume of water processed. The relationships between these various aspects of the filter assembly's performance are then established.

By way of example, assume that the various components of media 124 are selected to ensure that the effective life of the filter assembly 12 in controlling pH is the same as the effective life in reducing lead, chlorine, and hydrogen sulfide. In that case, the litmus test described above provides a direct indication of the continuing ability of the filter assembly to reduce lead, chlorine, and hydrogen sulfide from the water. More particularly, the cartridge's useful life in reducing lead, chlorine, and hydrogen sulfide has expired when the color of the litmus paper used to test water after processing by filter assembly 12 is the same as the reference color.

As will be appreciated, the effective life of the filter assembly 12 in controlling pH may alternatively be less than the effective life of the filter assembly in reducing, for example, lead, chlorine, and hydrogen sulfide. In that case, the litmus test provides an assurance that the cartridge will remain fully able to reduce lead, chlorine, and hydrogen sulfide, as long as the cartridge is replaced when the color of the litmus paper used to test water before and after processing is the same. In the event the effective life of the filter assembly in controlling pH is longer than the effective life of the filter assembly in reducing lead, chlorine, and hydrogen sulfide, the litmus test will indicate that the cartridge should be replaced when the color of the litmus paper used in the post-processing test is somewhat darker than the reference color.

To assist the user in interpreting the colors of the preprocessing and postprocessing litmus test papers, a chart including a bar of continuously varying color may be employed. Adjacent that bar, separate graduated scales may be positioned to indicate, for example, the relative effectiveness of the cartridge at adjusting pH; reducing lead, chlorine, and hydrogen sulfide; and removing particulate. The user simply identifies the portion of the bar whose color corresponds to the color of the litmus paper used to test the water after processing, and then reads the scale associated with the property of interest to determine the relative effectiveness of the cartridge in achieving that property, expressed, for example, as a percentage.

There are a number of advantages to this technique for evaluating the depletion or effectiveness of the various components of media 124. In that regard, the litmus test is extremely inexpensive, is simple to perform and evaluate, and provides immediate feedback concerning the water's characteristics. In contrast, the effectiveness of the cartridge in reducing lead would conventionally be determined by, for example, the relatively complicated, expensive, and time-consuming procedures of atomic absorption spectrophotometry, not commonly available to the consumer.

Having reviewed the basic components of filter assembly 12, the manner in which these components are combined will now be described. Although any order of assembly may be adopted, the seal 24, which is preferably an O-ring (roughly 0.5 centimeter thick and 15.9 centimeters in diameter), is, for example, first placed in the gland 48 of housing body 26. The O-ring 24 will project slightly from gland 48.

Next, the prefilter 20 is introduced into housing 16. The prefilter 20 is coaxially aligned with the body 26 of housing 16. The location of the prefilter 20 is determined, in part, by the engagement of the wound fiber 98 with the entire circumference of the prefilter seals 54 and 56 inside the housing dome 34.

The main cartridge 22 is then introduced into housing 16. More particularly, the inlet end 108 of main cartridge 22 is inserted axially through prefilter 20 until the positioning cup 112 that is recessed in the inlet end 108 receives the locator 50 positioned on the interior 44 of housing dome 34. In this position, the inlet gasket 114 on the main cartridge 22 is securely positioned against the main filter seal 52 inside the housing dome 34.

The cap 18 is next coupled to the housing 16, prefilter 20, and main cartridge 22. In that regard, cap 18 is inserted into the open end of housing 16 and rotated relative thereto by, for example, applying opposing forces to the flat regions 70 of cap 18 and the buttresses 40 on housing 16. As the cap 18 is rotated, the threads 76 on cap 16 engage the threads 46 on the housing body 26, until the O-ring 24 is slightly compressed (roughly 0.1 centimeter) between cap 18 and housing 16, providing a seal therebetween.

At the same time, the central positioning flange 120 on the main cartridge 22 is gradually being introduced into the cylindrical recess 92 in cap 18. Further, the first and second prefilter seals 86 and 88 on cap 18 engage the wound fiber 98 of prefilter 20 along two coaxially spaced-apart regions. As a result, the ends of the prefilter 20 and main cartridge 22 adjacent cap 18 are securely retained in place.

The outlet gasket 122 around the central positioning flange 120 of the main cartridge 22 is also compressed (roughly 1 millimeter) by the main cartridge seal of cap 18. Similarly, the inlet gasket 114 at the other end of main cartridge 22 is compressed (roughly 1 millimeter) by the main cartridge seal 52 on housing 16. As a result, watertight seals are provided radially inward of the main cartridge inlet ports 118 and radially outward of the main cartridge outlet opening 128.

Turning now to the input/output hardware 14, used with the filter assembly 12, the hardware 14 shown in the embodiment of FIG. 1 is specially designed for convenient use above, for example, a kitchen counter without undue consumption of counter space. As shown, hardware 14 includes a pair of threaded tube connectors 132 and 134, threaded into the inlet port 72 and outlet port 74 of cap 18. Connectors 132 and 134 are coupled to inlet and outlet tubes 136 and 138, respectively, which provide water to and from the filter assembly 12 and terminate in a reverse diverter assembly 140.

The diverter assembly 140 is designed, for example, to be attached to a water faucet 142 and includes an inlet 144 and "standard" and "filtered" outlets 146 and 148, respectively. A push-pull switch 150 provided on diverter assembly 140 normally causes water from faucet 142 to flow directly from the inlet 144 of the diverter assembly 140 to the standard outlet 146, without filtration. By moving switch 150 to a "filtered" position, however, water flow is diverted from inlet 144, through inlet tube 136, filter assembly 12, and outlet tube 138, to the filtered outlet 148.

Describing this "filtered" water flow path in greater detail, reference is had to the cross-sectional view of FIG. 3. Water flowing through inlet tube 136 enters filter assembly 12 at the inlet port 72. In FIG. 3, inlet port 72 is shown roughly 180 degrees apart from outlet port 74 for illustrative purposes, although, as shown in FIG. 5, the inlet port 72 and outlet port 74 are provided in the same flat region 70 of cap body 58. Because the inlet port is radially offset with respect to the cylindrical wall 80 opposite port 72, a circular flow is imparted to the water around wall 80. At this point, the water occupies an annular, cylindrical "prefilter" chamber 152, defined between the housing body 26 and the prefilter 20.

Because the ends of prefilter 20 abut the housing prefilter seals 54 and 56 and the cap prefilter seals 86 and 88, the flow of water from the prefilter chamber 152 is primarily radially through the fiber 98 and porous core 96 of prefilter 20. As previously discussed, the wound fiber 98 of the preferred embodiment removes particulate and microorganisms as small as one-half micron in size.

From the prefilter 20, the water enters an annular "intermediate" filter chamber 154 defined between the prefilter core 96 and the main cartridge shell 100. Because the main cartridge shell 100 is impermeable to the water and is sealed at its outlet end 106 by gasket 122, water flows from the intermediate filter chamber 154 through the inlet ports 118 in main cartridge 22.

At the main cartridge inlet ports 118, the water continues to flow axially through the inlet mesh 126, filter media 124, and outlet mesh 130 of main cartridge 22 to the outlet opening 128. As will be appreciated from the discussion of filter media 124 provided above, filter media 124 may perform a reduction-oxidation reaction on the water, may remove particulate and microorganisms, may otherwise remove or neutralize chemical contaminants, and may remove taste and odor from water.

Once the water reaches the outlet opening 128 of main cartridge 22, it is conducted by the outlet channel 90 in cap body 58 through outlet port 74. There, the water exits the filter assembly 12 and travels through outlet connector 134 and tube 138, to be dispensed at the filter outlet 148 of diverter assembly 140.

As will be appreciated from the preceding discussion of the flow path through filter assembly 12, filtration is accomplished radially by prefilter 20 and axially by main cartridge 22. The prefilter 20 and main cartridge 22 are cooperatively designed to ensure that prefilter 20 removes the larger particulate (e.g., in the one-half-to five-micron range), while the main cartridge 22 is more specifically designed to treat local water problems. With the larger particulate removed by prefilter 20, the main cartridge 22 will typically have a longer life and will not require replacement as often. Because the prefilter 20 is less expensive than main cartridge 22, the cost of maintaining the system 10 is, thus, reduced.

If the main cartridge 22 or prefilter 20 requires replacement, however, it is accomplished in the following manner. First, counterrotation between the housing 16 and cap 18 is initiated by the application of opposing forces to the housing buttresses 40 and the flat region 70 on cap 18. The cap 18 is then removed from housing 16, along with the prefilter or cartridge needing replacement, and the new prefilter or cartridge inserted. The cap 18 and housing 16 are then reconnected in the manner described above.

Summarizing some of the advantages of the filter system 10 shown in FIG. 1, as already noted, the system 10 is capable of removing particulate as small as one-half micron. Given the relatively large surface area of prefilter 20 (roughly 195 percent larger than conventional wound filter elements) and mass of prefilter 20 (roughly 290 percent larger than conventional wound filter elements), as well as the large cross-sectional area of the main cartridge 22, water can still be purified at the relatively high continuous rate of between three and four liters/minute.

Further, by employing both a wound prefilter 20 and main cartridge 22, the filter assembly 12 can be easily constructed to address any of a wide variety of other conditions. In that regard, either or both components can be substituted to address different anticipated water conditions. Also, because the various components of the nonmonolithic filter assembly 12 can be replaced, the life of assembly 12 is not limited to the life of the least enduring component.

As noted above, by using the less expensive prefilter 20 to perform "coarse" filtering, the life of the more expensive main cartridge 22 can be extended. If the main cartridge 22 does require replacement, existing filters that are smaller in outer diameter but have the same relative seal size and spacing as main cartridge 22 can be used.

The radially offset inlet and outlet ports (see FIG. 5) further induce a helical flow in the water through the filter assembly 12, enhancing circulation around and through prefilter 20 and main cartridge 22. Thus, for example, the region of prefilter 20 opposite the inlet port is less likely to clog, increasing prefilter life.

Figure 8:
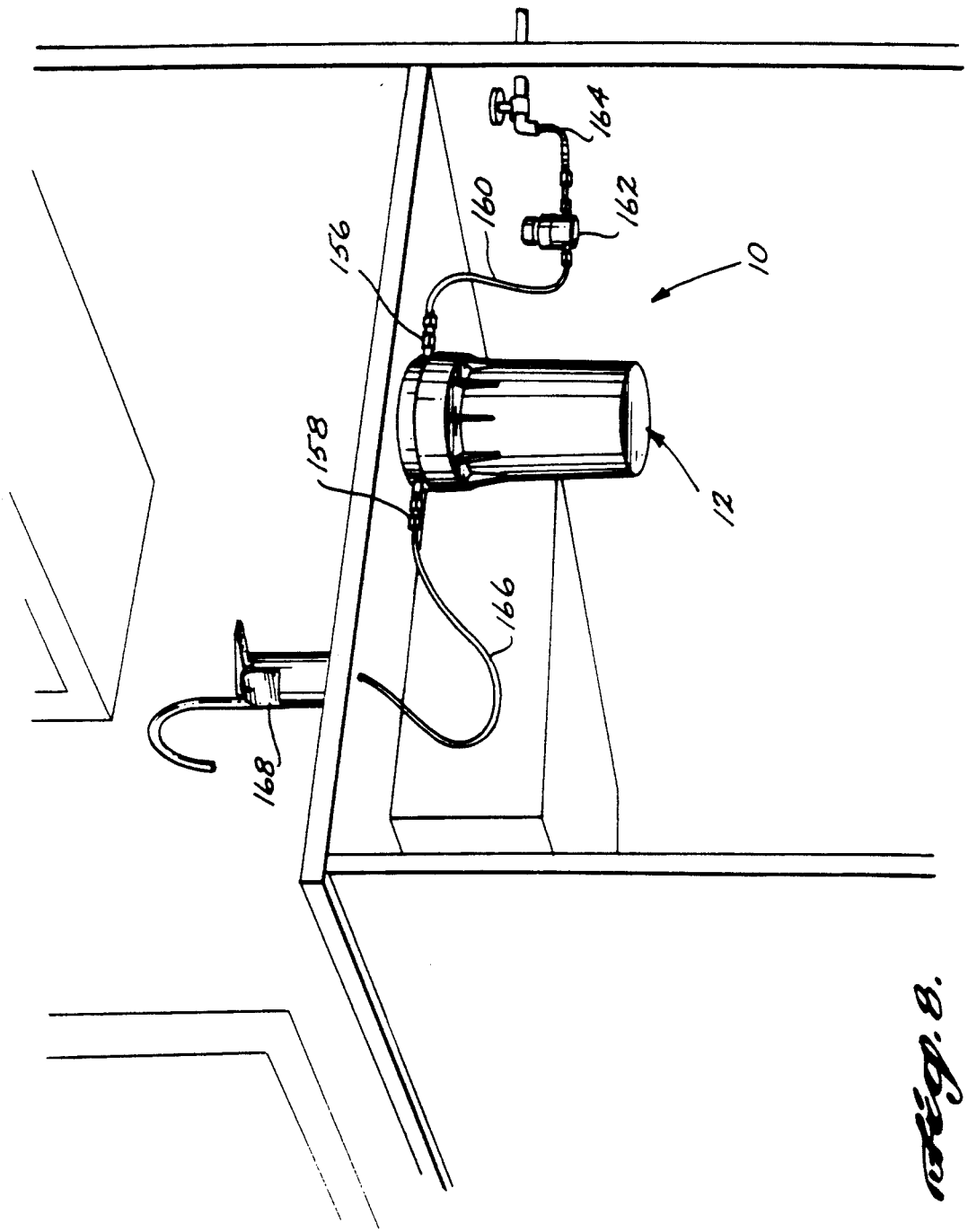
FIG. 8 is an illustration of an alternative embodiment of the filter system of FIG. 1 for use in a below-the-counter application.

Turning now to another embodiment of the filter assembly 10, reference is had to FIG. 8. In this embodiment, the filter assembly 12 is identical to that previously discussed in connection with FIG. 1. The input/output hardware 14, however, is designed for use, for example, below a kitchen counter.

More particularly, as shown, the inlet port 72 is no longer located adjacent the outlet port 74 on the same flat region 70 of cap 18. Rather, it is positioned a little less than 180 degrees away from the outlet port 74, in the opposing flat region 70 (see FIG. 3). Both the inlet and outlet ports 72 and 74 are provided with threaded connectors 156 and 158.

An inlet tube 160 is releasably coupled to connector 156 and extends to a pressure regulator 162 before terminating at the supply conduit 164 of an existing water system. The outlet connector 158 is coupled to an outlet tube 166 that extends to a demand tap 168 positioned above the counter.

Operation of this filter system 10 of FIG. 8 is approximately the same as that discussed above in connection with the filter system 10 of FIG. 1. However, now, unfiltered and filtered water are available from faucet 142 and demand tap 168 simultaneously.

Advantageously, the filter assembly 12 is identical for both embodiments with the exception of the location of the inlet port in the cap 18. The cap 18 can be molded with inlet ports at both locations and a plug used to block the port that is not required. In the preferred embodiment, however, only one inlet port is provided in the cap 18, with the inlet port's location being dependent on the application of filter system 10. In either case, system 10 is readily adaptable for above-the-counter and below-the-counter use with very simple modifications or substitutions of the cap 18 and hardware 14.

Figure 9:
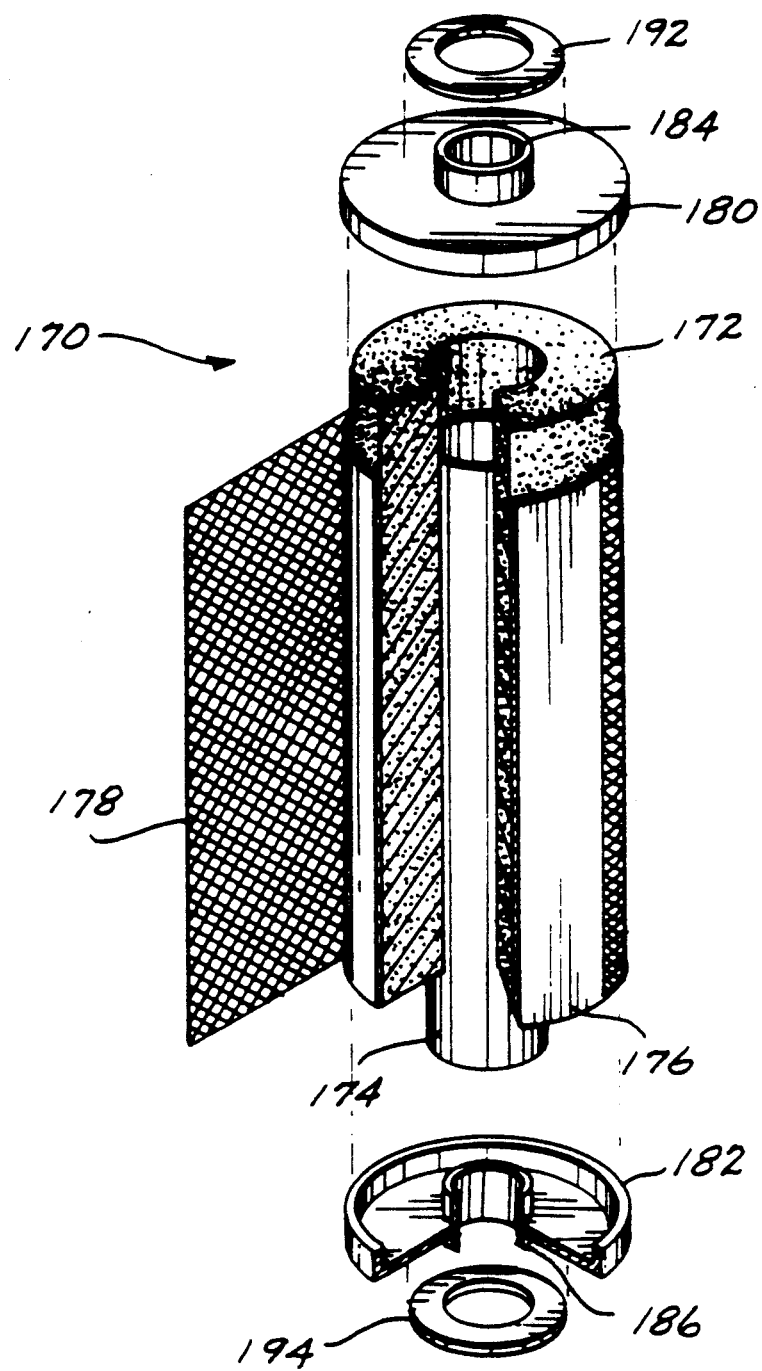
FIG. 9 is an illustration of an alternative embodiment of the main cartridge of FIGS. 2, 3, 6, and 7.

Referring now to FIG. 9, an alternative embodiment of the main cartridge 22 is shown. This alternative cartridge 170 is used with the same housing 16, cap 18, prefilter 20 and cap seal 24 as cartridge 22. As will be described in greater detail below, however, cartridge 170 is constructed to filter fluid flowing radially therethrough, in contrast to the axial filtration performed by cartridge 22.

As shown in FIG. 9, cartridge 170 may include filter media 172 coaxially supported between a cylindrical internal core 174 and a cylindrical external sleeve 176. Filter media 172 may be made of any of the various elements previously discussed in connection with media 124. In one preferred arrangement, media 172 is a sintered ceramic/carbon matrix.

The core 174 and sleeve 176 may, in turn, be made of any material having a thickness and porosity suitable for retaining media 172, without inhibiting the radial flow of fluid therethrough. In the preferred arrangement, core 174 and sleeve 176 are made, for example, of a suitable FDA approved plastic. A mesh screen 178, made of polypropylene, is provided around the sleeve 176.

The two ends of cartridge 170 are provided with caps 180 and 182 made, for example, of polypropylene. Caps 180 and 182 include circular bosses 184 and 186 that project coaxially from circular plates 188 and 190. Rubber gaskets 192 and 194 surround the bosses and correspond to gaskets 114 and 122 of cartridge 22.

In use, the cartridge 170 is positioned coaxially within prefilter 20. As the cap 18 is threaded onto housing 16, bosses 184 and 186 are captivated by the locator 50 of housing dome 34 and the cylindrical recess 92 of cap 18. The gaskets 192 and 194 provide a seal between cartridge 170, housing 16, and cap 18. As a result, the fluid to be filtered is required to flow radially through mesh screen 178, sleeve 176, media 172, and core 174, rather than around cartridge 170. The filtered fluid then exits cartridge 170 via boss 182.

As will be appreciated from the earlier discussion of cartridge 22, different cartridges 170 can be constructed employing different media 172 to account for variations in the fluid to be filtered. As a result, the filter assembly 12 is readily adaptable to different water conditions encountered. Because the difference between various media 172 may be apparent only on a microscopic level, however, it could be difficult for a user to identify a cartridge including suitable media 172.

As a result, several different schemes have been developed to allow the appropriate cartridge 170 to be more readily identified. For example, the cartridge could be sold with packaging that indicates the type of water conditions the cartridge is to be used with. The cartridge 170 itself could also be marked with some form of alphanumeric code used to indicate suitable applications for the cartridge 170.

In the preferred arrangement, however, a color coding scheme is used to readily distinguish various cartridge constructions and applications. More particularly, a plurality of different colors are identified, each of which corresponds to a different type of media and fluid condition to be treated. Then, by way of example, one or both of the end caps 180 and 182 included with a particular filter are molded from a colored plastic.

For example, a blue end cap or caps may be used with a cartridge designed to remove lead, other specific inorganic contaminants, herbicides, pesticides, and chlorine. A yellow end cap may be used on a cartridge designed to remove lead, other specific inorganic contaminants, fluoride, and chlorine. A green end cap may be used with a cartridge that removes fluoride and chlorine. A white end cap may be used on a cartridge that removes volatile organic contaminants. lindane, methoxychlor, 2, 4-D, silvex, toxaphene, and chlorine. Finally, a red end cap may be used on a cartridge that removes lead and other specific dissolved cationic contaminates plus chlorine, color, taste and tannis, and elevates pH alkalinity.

As a result, the color of the cap or caps identifies the media 172 employed and/or the type of water conditions the cartridge 170 is to be used with. The relationship between cap color and filter construction and use may be conveyed to the end user on the packaging or instructions for the filter assembly 12 or cartridge 170 at the time of sale. As will be appreciated, this color-coding arrangement allows the type of cartridge employed in assembly 12 to be identified more quickly and easily than the other approaches noted above.

The color-coding of end caps 180 and 182 is simply one of a variety of different color-coding arrangements that could be employed. For example, some portion of all of the mesh screen 178 or gaskets 192 and 194 could be colored to identify the cartridge. Similarly, the color-coding scheme could be employed with the axial-flow cartridge 22 discussed previously.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with a variety of different filter constructions. Further, it will be recognized that the location of the filter and the manner in which fluid is introduced and withdrawn can be varied as desired. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A water filter system, for filtering water, comprising:
   (a) a wound fiber filter for filtering fluid flowing therethrough;
   (b) second filter means for filtering fluid passed from said wound fiber filter, said second filter means including an alkaline leaching agent to increase the pH of the water;
   (c) housing means for receiving and supporting said wound fiber filter and said second filter means in coaxial alignment; and
   (d) cap seal means for providing a seal between said cap means and said housing means.

2. The water filter system of claim 1, wherein said alkaline leaching agent is included to increase the pH of the water to between 8 and 10.

3. The water filter system of claim 1, wherein said alkaline leaching agent is included to increase the pH of the water to roughly 10.

4. The water filter system of claim 1, wherein said alkaline leaching agent includes an alkali metal salt.

5. The water filter system of claim 4, wherein said alkali metal salt includes potassium carbonate.

6. The water filter system of claim 1, wherein said alkaline leaching agent includes an alkaline-earth metal salt.

7. The water filter system of claim 6, wherein said alkaline-earth metal salt is selected from a group including calcium carbonate, magnesium carbonate, calcium oxide and magnesium oxide.

* * * * *